April 8, 1969 S. A. AMES 3,437,957

MICROWAVE PHASE SHIFT MODULATOR FOR USE WITH
TUNNEL DIODE SWITCHING CIRCUITS
Filed June 28, 1966

INVENTOR.
STEPHEN A. AMES
BY Harry A. Herbert Jr
ATTORNEY
Eugene J. Pawlikowski
AGENT 3,437,957
Patented Apr. 8, 1969

3,437,957

MICROWAVE PHASE SHIFT MODULATOR FOR USE WITH TUNNEL DIODE SWITCHING CIRCUITS

Stephen Alexander Ames, Baltimore, Md., assignor, by mesne assignments, to the United States of America as represented by the Secretary of the Air Force Filed June 28, 1966, Ser. No. 562,430
Int. Cl. H03c 7/04
U.S. Cl. 332—16 1 Claim

ABSTRACT OF THE DISCLOSURE

A phase shift modulator has a ferrite circulator with three parts. A microwave signal is supplied to the first part of the circulator. The energy is circulated in the circulator and enters a terminated transmission line connected to the second port. A shorting plunger is provided at the terminated end of the transmission line. A point contact diode is positioned in the transmission line intermediate the port and the terminated end thereof. A direct current bias source is provided to set the bias on the point contact diode. The bias on the point contact diode and position of the shorting plunger are selected to present a load impedance at the second port equal to $1+j0$. A tunnel diode signal generator switching circuit is connected to the point contact diode to switch the phase relation between the incident wave and the reflected wave between a 0 phase shift and a $\pi$ radians out of phase condition. A utilization circuit is connected to the third port of the circulator.

This invention relates to high-speed switching device of the type used in wave guide multi-circuit networks and, particularly, to a microwave phase shift modulator compatible for use at the tunnel diode voltage levels employed in digital data computers.

Digital data computers which operate in the region of hundreds of megabits per second are generally of the type employing high speed tunnel diode switching circuits. It has been found that tunnel diodes operate more satisfactorily at such high bit rates than do transistors, the latter being limited in repetition rate and rise time. Problems arise, however, when it is attempted to modulate switching diodes using as a signal the output of tunnel diode data sources.

An object of this invention is to provide a microwave phase shift modulator compatible with tunnel diode operating levels in ultra high bit rate digital data sources.

A further object of this invention is the provision of a microwave phase shift modulator having carrier suppression therein.

Figure 1:
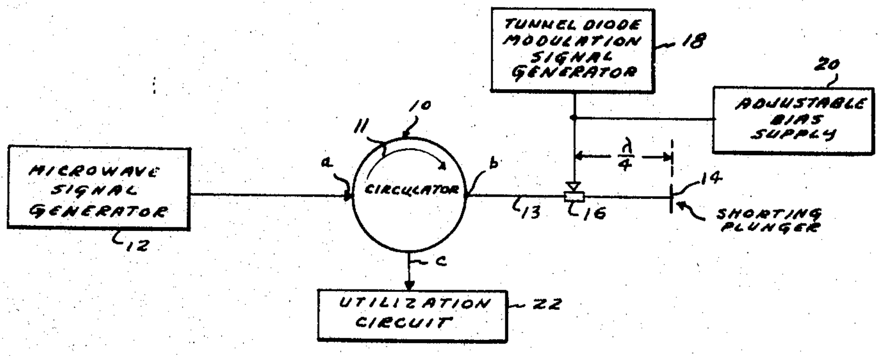
Figure 2:
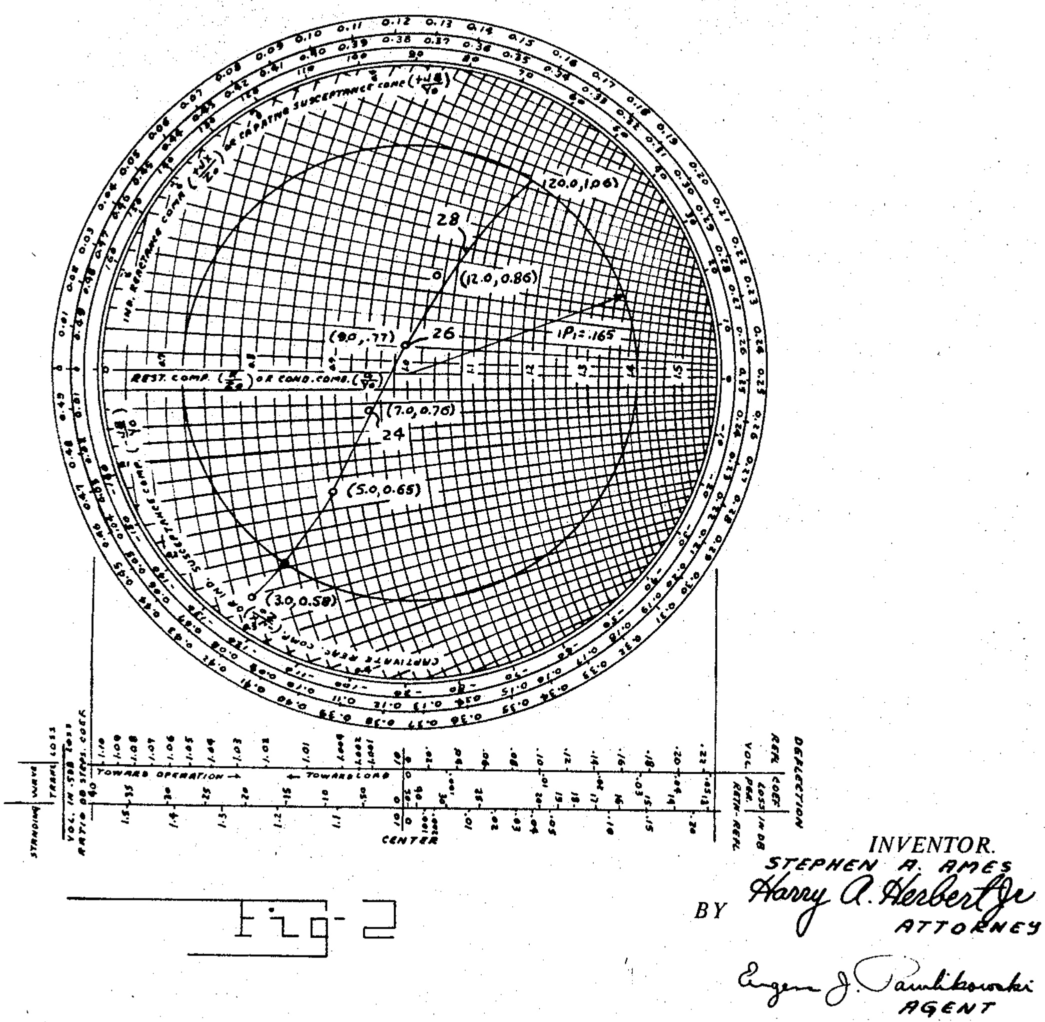

The features, other objects, and advantages of the invention will become more apparent as the description proceeds taken with reference to the appended drawings in which:

FIG. 1 is a schematic representation of the microwave phase shift modulator embodying the invention; and FIG. 2 is a Smith chart diagramming the aspects of the invention for achieving phase-shift keyed modulation.

Referring now to FIG. 1, there is shown a ferrite circular 10 having three symmetrically located ports designated herein *a*, *b* and *c*, and propagation characteristics established according to the direction of the arrow 11. A microwave carrier signal such as the continuous wave type is generated by a microwave signal generator 12 and fed into port *a* of circulator 10. The circulator has the property that energy entering port *a* is circulated in the direction of the arrow 11 and leaves by means of port *b*. In addition, any energy entering port *b* in an inward direction will be circulated around and leave via port *c*. For applications requiring carrier suppression, a termination downstream along transmission line 13 is produced by means of a shorting plunger 14 located at the end of transmission line 13 which is connected to port *b*. A diode switch 16, which may be of the point contact diode type well known in the art, is located intermediate shorting plunger 14 and the port *b*. A modulation-signal generator 18 is connected to the diode switch 16 and controls the conducting and non-conducting periods of diode switch 16 from which its shorting and open conditions are produced.

An adjustable bias supply 20 controls the direct current voltage supply to diode switch 16. As used in the preferred embodiment, switch 16 is located a distance which is approximately a quarter-wavelength of the carrier frequency of generator 12 from the shorting plunger 14. If the diode switch 16 is biased "off" (not passing RF) when the microwave energy enters port *a* of a circulator 10 and enters port *b*, the incident signal is reflected by the diode switch due to the reverse biasing and reenters port *b* to finally emerge from port *c*. A utilization circuit 22 adapted to receive the modulated carrier output signal through circulation from port *b* to port *c* is connected to port *c*. For the purposes of this specification, the non-conducting condition of diode switch 16 will be called the zero (0) state. When the diode switch is biased on, the signal as it enters port *b* and travels along transmission line 13 passes the diode switch to be eventually reflected back into port *b* by the shorting plunger 14. In so doing, a further distance $\lambda/2$ must be travelled by the signal than in the case of the non-conducting condition of diode switch 16. The symbol $\lambda$ represents the wavelength of the carrier energy of generator 12.

For operation as a balanced modulator the phase of the signal at port *c* changes by 180° in accordance with the modulating signal. Thus, when the shorting plunger is adjusted to be one-fourth of $\lambda$ behind the plane of diode switch 16 the path length over the path extending from port *a* to port *c* is increased by one-half the wavelength $\lambda$. This condition of phase reversal hereinafter will be referred to as the $\pi$ state as distinguished from the 0 state with no phase reversal.

Looking into port *b* from the direction of circulator 10 and assuming ideal switching conditions, the reflection coefficient, P, is demonstrated to be of constant absolute value, unity, and to reverse in phase when diode switch 16 is switched from the aforesaid 0 state to the $\pi$ state. It is also generally true that very high speed microwave diode switches require rather large bias voltages for their operation and therefore are incompatible with tunnel diode drivers whose voltage requirements are much less. For driving point contact diode switches of the type of which diode switch 16 is assumed to be representative, bias values on the order of one volt forward bias and twenty volts reverse bias must be produced. Such levels are recognized to be beyond the capability of present state-of-the art tunnel diodes.

The present invention has as one principal object to achieve phase reversal modulation and thus carrier suppression with arbitrarily small video driving voltages. Extremely favorable results are achieved by recognizing that the reflection coefficient has desirable properties as the bias applied to the diode switch 16 is varied. This property is illustrated in FIG. 2 for an IN3482 diode mounted in an RG(52)/U wave guide with the line 13 terminated in a short circuit and measurements being made using a slotted line and a VSWR indicator.

Of primary importance in the curves in FIG. 2 is that the trajectory P as a function of the bias voltage becomes close to being a straight line and passes through the point $1+jO$. It can be demonstrated mathematically that the reflection coefficient at a discontinuity in a transmission line is defined as $$P=\frac{V_r}{V_i}=\frac{Z_L-1}{Z_L+1} \quad (1)$$

where $V_r$ is the reflected voltage at the discontinuity, $V_i$ the incident voltage, and $Z_L$ the normalized complex load impedance. If $Z_L$ is changed to $1/Z_L$, the reflection coefficient becomes $-P$ which indicates that the reflected wave is $\pi$ radians out of phase with the incident wave. The amplitude of the reflected wave is $V_r=V_i|P|$. Changing from a normalized impedance $Z_L$ to $1/Z_L$ is equivalent to moving a distance one quarter the wavelength of $\lambda$ on the Smith chart on a circle of radius $|P|$. Since the locus of the set of all points ($Z_L$, $1+jO$, $1/Z_L$) lie on straight lines through the center of the chart, and since the diode switch 16 exhibits straight line behavior in its attenuation versus bias characteristics, it can be stated that phase shift keyed modulation of a microwave energy signal can be achieved with arbitrarily small modulating voltage swings by biasing the diode switch with a direct current voltage at the point $1+jO$, and then swinging the driving voltage such that the impedance changes from $Z_L$ to $1/Z_L$.

Referring to FIG. 2, the points on the $|P|=.165$ circle correspond to a modulator insertion loss of 15.5 db (return loss on radially scaled parameters). The numbers in parentheses beside each plotting point on the Smith chart give the diode current in ma. and the diode voltage in volts. The diode on which the curves of FIG. 2 are based is a Philco IN3482, the holder is a Philco type P901A, and the operating frequency of the microwave generator 12 is 9 gc. Midway between points 24 and 26 on the curve 28, it can be seen that the operating bias on diode switch 16 is approximately 8.0 ma. at 765 mv. Assuming a two-level output signal from modulation-signal generator 18, the video drive must swing about 17 ma. (20—3 ma. on the curve) and approximately 480 mv. (1060–580 mv.) peak to peak. These values of modulating voltage are well within the operating characteristics of high speed tunnel diode drivers.

It cannot be stated with absolute certainty whether the near straight line behavior exhibited by the point contact microwave switch used in the invention embodiment is unique or also holds for alloyed and diffused junction diodes as well. However, in the event of high modulator insertion loss, these can be compensated for by modulating at low levels and using linear amplification in the stages following the modulator. The proper bias setting and the length of the shorted line in the described device in order to arrive at the condition $Z_L=1+jO$ is best found by trial and error. This approach is explained by the fact that the characteristics of point contact switches vary greatly from unit to unit and it does not seem fruitful to measure the parameters of each diode before installation in the transmission line since such measurements are generally difficult to perform at X-band levels.

It therefore will be appreciated that the microwave phase shift modulator of the invention has certain advantages in its compatibility with extremely high bit rate digital data sources using tunnel diode. For example, drive voltages on the order of only a few millivolts were sufficient to achieve 0–$\pi$ phase keying. When driven by a square wave from generator 18 excellent carrier suppression results. Carrier suppression appears to be limited only by the relative amplitude stability of the D.C. bias and data sources. For tunnel diode data sources, carrier suppression in excess of 30 db should not be difficult when using the invention embodiment described hereinabove.

I claim:

1. A phase shift modulator comprising a ferrite circulator having a plurality of ports arranged for serial propagation of energy in said circulator, means for generating a microwave signal coupled to direct said signal into a first port of said circulator, a transmission line terminated at one end and connected at the other end to a second port, said second port receiving the energy which is circulated from said first port, said transmission line including a point contact switching diode located intermediate the terminated end of said transmission line and the second port of said ferrite circulator; means, including a direct current bias source connected to said switching diode and a shorting plunger at the terminated end of said transmission line for providing a transmission load impedance at said second port equal to $1+jO$, a tunnel diode modulation signal generator switching means, connected to said switching diode for switching the normalized complex load impedance at said second port between $Z_L$ and $1/Z_L$ whereby the reflected wave is switched between a 0 phase shift with respect to the incident wave and $\pi$ radians out of phase condition with respect to the incident wave and utilization circuit means connected to a third port and receiving the modulated carrier output signal which is circulated from said second port.

References Cited

UNITED STATES PATENTS

| | | | |
|---|---|---|---|
| 3,136,950 | 6/1964 | Mackey | 333—1.1 X |
| 3,182,203 | 5/1965 | Miller. | |

ALFRED L. BRODY, *Primary Examiner.*

U.S. Cl. X.R.

307—295; 325—138, 163, 448; 332—9, 44, 51, 52; 333—1.1